United States Patent
Ito et al.

(10) Patent No.: US 7,893,168 B2
(45) Date of Patent: Feb. 22, 2011

(54) HYDROPHOBIC LINEAR POLYROTAXANE MOLECULE AND CROSSLINKED POLYROTAXANE

(75) Inventors: Kohzo Ito, Tokyo (JP); Jun Araki, Tokyo (JP); Tatsuya Suzuki, Isehara (JP); Masahiko Yamanaka, Isehara (JP); Kentarou Watanabe, Atsugi (JP)

(73) Assignees: Nissan Motor Co., Ltd., Kanagawa (JP); The University of Tokyo, Tokyo (JP)

( * ) Notice: Subject to any disclaimer, the term of this patent is extended or adjusted under 35 U.S.C. 154(b) by 361 days.

(21) Appl. No.: 12/065,368

(22) PCT Filed: Aug. 23, 2006

(86) PCT No.: PCT/JP2006/316456
§ 371 (c)(1),
(2), (4) Date: Feb. 29, 2008

(87) PCT Pub. No.: WO2007/026577
PCT Pub. Date: Mar. 8, 2007

(65) Prior Publication Data
US 2009/0234049 A1    Sep. 17, 2009

(30) Foreign Application Priority Data
Aug. 31, 2005    (JP) .............................. 2005-250984

(51) Int. Cl.
*C08F 283/02* (2006.01)
(52) U.S. Cl. .................. 525/418; 525/384; 525/50; 525/55
(58) Field of Classification Search .................. 525/418, 525/384, 50, 55
See application file for complete search history.

(56) References Cited

U.S. PATENT DOCUMENTS 6,828,378 B2 * 12/2004 Okumura et al. ............. 525/55

2003/0138398 A1    7/2003 Okumura et al.
2005/0042753 A1 *  2/2005 Yang et al. .................. 435/455

FOREIGN PATENT DOCUMENTS

| CN | 1426424 A | 6/2003 |
|---|---|---|
| EP | 1283218 A1 | 2/2003 |
| EP | 1 693 399 | 8/2006 |
| JP | 9-301893 A | 11/1997 |
| JP | 3475252 B2 | 9/2003 |
| JP | 2005-075979 A | 3/2005 |
| JP | 2005-154675 A | 6/2005 |
| WO | WO 01/83566 A1 | 11/2001 |

OTHER PUBLICATIONS

Office Action issued by Korean Patent Office dated Sep. 25, 2009 for Korean Patent Application No. 10-2008-7004801.
L. Huang et al., "Study of the inclusion compounds formed between α-cyclodextrin and high molecular weight poly(ethylene oxide) and poly(ε-caprolactone)," Polymer, vol. 39, No. 20, 1998, pp. 4857-4865.
Harada et al, "Complex formation of poly (Epsilon-Caprolactone) with cyclodextrin", Macromol. Rapid Communications, 1997, vol. 18 (7), pp. 535-539.

* cited by examiner

*Primary Examiner*—Ling-Siu Choi
(74) *Attorney, Agent, or Firm*—Foley & Lardner LLP

(57) ABSTRACT

To provide a hydrophobic linear polyrotaxane molecule which is soluble in an organic solvent, and a crosslinked polyrotaxane using the same.

A hydrophobic linear polyrotaxane molecule has a cyclic molecule, a linear molecule including the cyclic molecule with piercing through the cyclic molecule, and blocking groups placed at both end terminals of the linear molecule to prevent the cyclic molecule from leaving from the linear molecule. The linear molecule is hydrophobic. The linear molecule is polycaprolactone and has a molecular weight ranging from 5,000 to 100,000. The cyclic molecule is α-cyclodextrin, β-cyclodextrin or γ-cyclodextrin.

A crosslinked polyrotaxane is formed by combining the hydrophobic linear polyrotaxane molecule and a polymer through the cyclic molecule.

7 Claims, 2 Drawing Sheets

HYDROPHOBIC LINEAR POLYROTAXANE MOLECULE AND CROSSLINKED POLYROTAXANE

TECHNICAL FIELD

The present invention relates to a novel polyrotaxane, and more particularly to a polyrotaxane which is soluble in an organic solvent and has a hydrophobic linear molecule and to a crosslinked polyrotaxane using the same.

BACKGROUND ART

Hitherto, gel materials are extensively used for articles of food, medical products, living goods, industrial products and the like. Although a variety of kinds of polymer compounds are used for these, only two kinds of physical gel and chemical gel exist from the viewpoint of structure.

Physical gel is a gel usually seen in natural world, such as gelatin or agar-agar. Additionally, a greater part of the tissue of a living body is occupied with a variety of physical gels.

Such physical gel constitutes a network under a physical attraction acted between polymers, and therefore it is low in stability against temperature and solvent.

To the contrary, chemical gel is a huge single molecule in which direct bondings with covalent bonds are made in the whole network, and therefore it is excellent in stability against temperature and solvent so as to be industrially used in various fields.

However, in chemical gel, a crosslinking point is fixed, and therefore an inhomogeneous structure formed by a crosslinking reaction is permanently kept so that it has the defect of being remarkably low in mechanical strength.

Against this, in recent years, a proposition with a new method has been made for a new kind of gel, namely, "slide-ring gel or topological gel" which cannot be classified into either physical gel or chemical gel. Polyrotaxane is used for such slide-ring gel.

In this polyrotaxane, a linear molecule (axis) includes a cyclic molecule (rotator) in such a manner as to pierce through the opening of the cyclic molecule, and blocking groups are placed at both end terminals of the linear molecule to prevent the cyclic molecule from leaving from the linear molecule. A crosslinked polyrotaxane applicable to the slide-ring gel is disclosed (see patent literature 1), in which a plurality of such polyrotaxanes are crosslinked with each other.

Patent literature 1: Japanese Patent No. 3475252 publication

In this crosslinked polyrotaxane, the cyclic molecule pierced with the linear molecule is movable along the liner molecule (by a pulley effect) so that the crosslinked polyrotaxane has a viscoelesticity. Accordingly, if a tension is applied to the crosslinked polyrotaxane, the tension is uniformly dispersed under this pulley effect, and therefore it has the excellent characteristics of being difficult to cause crack or flaw, differently from a conventional crosslinked polymer.

DISCLOSURE OF THE INVENTION

Problems to be Solved by the Invention

However, such conventional polyrotaxane has many hydroxyl groups having hydrophilicity but it is almost insoluble in organic solvent since the hydroxyl groups are combined with a cyclic glucose.

In view of this, an application range of polyrotaxane is liable to be narrow, in which there is such a problem that an application thereof to paint, adhesive and the like requiring a particular durability is difficult.

The present invention is made in view of the problems of such conventional techniques, and an object thereof is to provide a hydrophobic linear polyrotaxane molecule which is soluble in an organic solvent, and a crosslinked polyrotaxane using the same.

Means for Solving Problems

The present inventors have reached the present invention upon finding to attain the above object by employing a hydrophobic molecule as the linear molecule, as a result of eager studies in order to attain the above object.

Specifically, a hydrophobic linear polyrotaxane molecule of the present invention comprises a cyclic molecule, a linear molecule including the cyclic molecule with piercing through the cyclic molecule, and blocking groups placed at both end terminals of the linear molecule to prevent the cyclic molecule from leaving from the linear molecule, and is characterized in that the linear molecule is hydrophobic.

Additionally, a preferred embodiment of the hydrophobic linear polyrotaxane molecule of the present invention is characterized in that the linear molecule is polycaprolactone.

On the other hand, the activated crosslinked polyrotaxane of the present invention is characterized by being formed by combining the above-mentioned hydrophobic linear polyrotaxane molecule and a polymer through the cyclic molecule.

EFFECTS OF THE INVENTION

According to the present invention, a molecule having hydrophobicity is employed as the linear molecule, which allows to provide a hydrophobic linear polyrotaxane molecule soluble in an organic solvent, and a crosslinked polyrotaxane using the same.

BEST MODE FOR CARRYING OUT THE INVENTION

Figure 1:
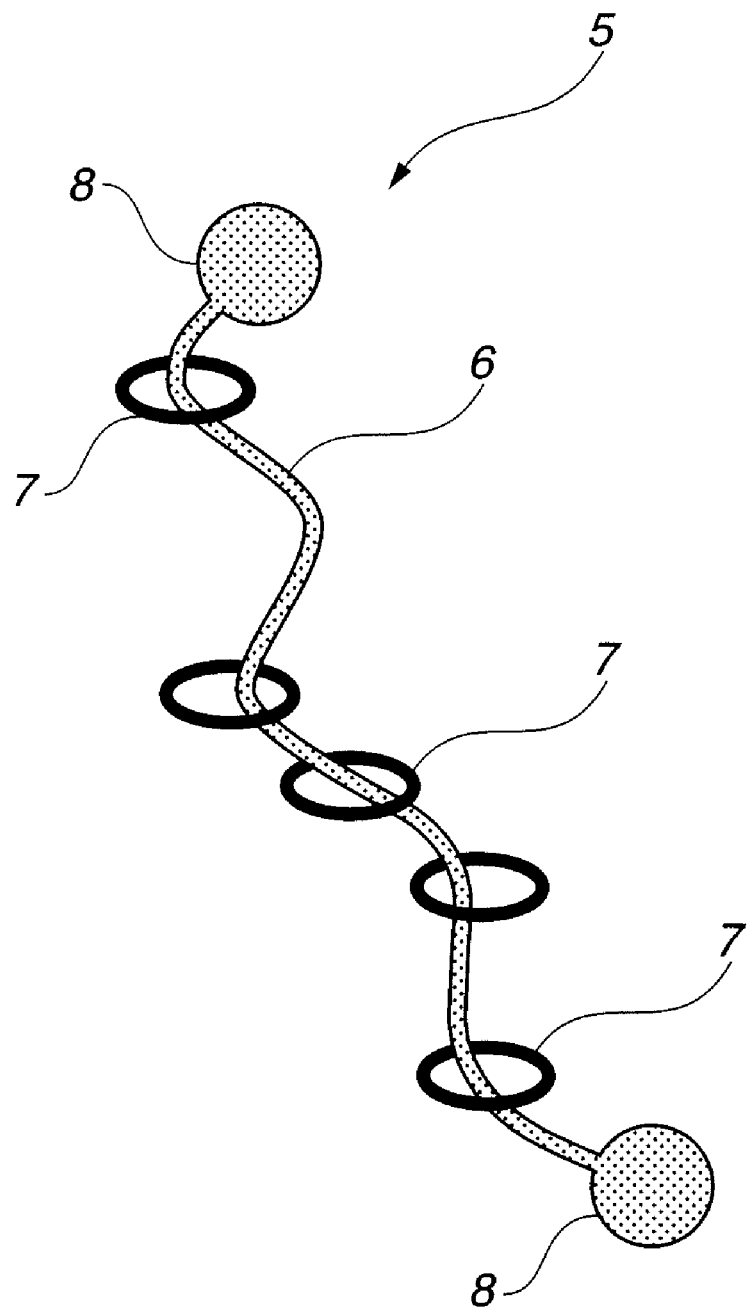
FIG. 1 is a schematic illustration conceptually showing a hydrophobic linear polyrotaxane molecule of the present invention.

Hereinafter, the hydrophobic linear polyrotaxane molecule of the present invention will be discussed in detail. In the specification of the present application, "%" represents % by mass unless otherwise specified.

As discussed above, the hydrophobic linear polyrotaxane molecule of the present invention has a cyclic molecule and a linear molecule which places blocking groups at its both end terminals.

Additionally, the linear molecule is hydrophobic and includes the cyclic molecule in such a manner as to pierce through the opening of the cyclic molecule. Further, the linear molecule prevents the cyclic molecule included by the linear molecule from leaving from the linear molecule, with the blocking groups placed at both end terminals of the linear molecule.

The linear molecule may substantially have a straight chain and may have a branched chain as far as inclusion is allowed in such a manner that the cyclic molecule serving as the rotator is rotatable and can exhibit the pulley effect.

Additionally, the length of the linear molecule is not limited to a particular one as far as the cyclic molecule can exhibit the pulley effect, though it is influenced by the magnitude of the cyclic molecule.

The linear molecule preferably has reactive groups at its both end terminals, by which the linear molecule can be readily reacted with the above-mentioned blocking groups.

Such reactive group may be suitably changed in accordance with kinds of the blocking group to be employed, and exemplified by hydroxyl group, amino group, carboxyl group and thiol group.

In the hydrophobic linear polyrotaxane molecule of the present invention, the linear molecule has a hydrophobicity, by which the hydrophobic linear polyrotaxane molecule can be soluble in an organic solvent even if a hydroxyl group of the cyclic molecule such as the below-discussed cyclodextrin does not necessarily have a hydrophobic modification group.

Such generation of the solubility in solvent provides a reaction field, typically the crosslinking field or the organic solvent to polyrotaxane which is hitherto almost insoluble or insoluble in a water-like solvent and in the organic solvent. In other words, polyrotaxane of the present invention is improved in reactivity so that crosslinking with other polymers and modification with a modification group can be readily accomplished in presence of the organic solvent.

The hydrophobic linear molecule is not limited to a particular one, in which the examples of the hydrophobic linear molecule are polyesters such as polyalkyls and polycaprolactones, polyethers, polyamides, polyacrylic acids, and linear molecule having benzene ring.

Further, when the hydrophobic linear molecule is polycaprolactone, the molecular weight thereof is preferably within a range of from 5,000 to 100,000, more preferably within a range of from 10,000 to 50,000, much more preferably within a range of from 10,000 to 20,000.

If the molecular weight is less than 5,000, the cyclic molecule such as cyclodextrin becomes high in insolubility in solvent so that the obtained polyrotaxane becomes low in solubility. If the molecular weight exceeds 100,000, the solubility sometimes becomes low.

On the other hand, the cyclic molecule is not particularly limited as far as it is included by the linear molecule as discussed above and exhibits the pulley effect, and is exemplified by various cyclic substances.

Further, it is essential only that the cyclic molecule is substantially cyclic, and therefore the cyclic molecule may be those which are not completely closed, such as those which are C-shaped.

The cyclic molecule preferably has reactive group, by which the cyclic molecule can be readily crosslinked with other polymers and readily combined with the modification group.

Such reactive group may be suitably changed in accordance with kinds of a crosslinking agent to be used, in which examples of the reactive group are hydroxyl group, amino group, carboxyl group, thiol group and aldehyde group.

Further, it is preferable that the reactive group is a group which does not react with the blocking groups when the blocking groups are formed (the below-discussed blocking reaction).

Concrete examples of the cyclic molecule are various cyclodextrins such as α-cyclodextrin (the number of glucose: 6), β-cyclodextrin (the number of glucose: 7), γ-cyclodextrin (the number of glucose: 8), dimethylcyclodextrin, glucocyl-cyclodextrin, and derivatives and modified compounds of these, as well as crown ethers, benzo crowns, dibenzo crowns, dicyclohexano crowns, and derivatives and modified compounds of these.

One kind of cyclic molecule such as the above-mentioned cyclodextrins can be singly used, or not less than two kinds of them are used in combination.

As such cyclic molecule, α-cyclodextrin, β-cyclodextrin and γ-cyclodextrin are particularly preferable, in which α-cyclodextrin is preferable from the viewpoint of the characteristics of including being included.

Incidentally, the hydrophobic linear polyrotaxane molecule of the present invention can be further improved in solubility in solvent if the hydrophobic modification group is introduced to the hydroxyl group of cyclodextrin.

Further, the hydrophobic linear polyrotaxane molecule can be improved in reactivity with other polymers if the introduced hydrophobic modification group has a functional group.

In the hydrophobic linear polyrotaxane molecule of the present invention, the number (an inclusion amount) of the cyclic molecules included by the linear molecule is preferably within a range of 0.06 to 0.61, more preferably within a range of from 0.11 to 0.48, and furthermore preferably within a range of from 0.24 to 0.41 on the assumption that the maximum inclusion amount is 1, in case that the linear molecule is polycaprolactone while the cyclic molecule is cyclodextrin.

If the inclusion amount is less than 0.06, the pulley effect may not be exhibited. If the inclusion amount exceeds 0.61, the cyclic molecules are placed too close to each other so that the movability of the cyclic molecule may be lowered. Additionally, insolubility of cyclodextrin itself in solvent is strengthened so that the solubility of the obtained polycaprolactone in solvent may be lowered.

Next, the blocking group may be any group which is placed at both end terminals of the linear molecule to maintain a condition where the cyclic molecule is pierced with the linear molecule pierces.

Such a group is a group having a "bulkiness" or a group having an "ionic character". Here, "group" means a variety of groups including a molecule group and a polymer group.

Examples of the group having the "bulkiness" are a spherical group and a side wall-shaped group.

Additionally, the ionic character of the group having the "ionic character" and the ionic character of the cyclic molecule are mutually affected, for example, repel each other, so as to maintain a condition where the cyclic molecule is pierced with the linear molecule.

Concrete examples of such a blocking group are dinitrophenyl groups such as 2,4-dinitrophenyl group, 3,5-dinitrophenyl group and the like, cyclodextrins, adamantine groups, trityl groups, fluoresceins, pyrenes, and derivatives and modified compounds of these.

Next, a production method of the hydrophobic linear polyrotaxane molecule of the present invention will be discussed.

As discussed above, the hydrophobic linear polyrotaxane molecule of the present invention can be obtained by accomplishing a process including (1) a step of mixing a cyclic molecule and a linear molecule so that the hydrophobic linear molecule includes the cyclic molecule in such a manner that the hydrophobic linear molecule pierces through the opening of the cyclic molecule, and (2) a step of blocking the both end terminals (the both end terminals of the hydrophobic linear molecule) of an obtained pseudo-polyrotaxane with blocking groups so as to make adjustment to prevent the cyclic molecule from releasing from a piercing condition.

By the above production method, the polyrotaxane of the present invention, excellent in solubility in an organic solvent as discussed above, can be obtained.

Such an organic solvent is not particularly limited and is exemplified by alcohols such as isopropyl alcohol and butyl alcohol, esters such as ethyl acetate and butyl acetate, ketones such as methyl ethyl ketone and methyl isobutyl ketone, ethers such as diethyl ether and dioxane, hydrocarbon solvents such as toluene and xylene. The hydrophobic linear polyrotaxane molecule of the present invention exhibits a good solubility in a solvent prepared by mixing not less than two kinds of these.

Next, a crosslinked polyrotaxane of the present invention will be discussed.

The crosslinked polyrotaxane of the present invention is formed by crosslinking the above-mentioned hydrophobic linear polyrotaxane molecule of the present invention and a polymer, in which the polymer is combined with the hydrophobic linear polyrotaxane molecule through the cyclic molecule of the hydrophobic linear polyrotaxane molecule.

Here, the polymer crosslinked with the hydrophobic linear polyrotaxane molecule through the cyclic molecule is not limited to a particular one, and preferably has hydroxyl group, amino group, carboxyl group, epoxy group, vinyl group, thiol group or a photocrosslinking group, or a group relating to any combination of these at the main chain or the side chain.

Examples of the photocrosslinking group are cinnamic acid, coumarin, chalcone, anthracene, styrylpyridine, styrylpyridinium salt and styrylquinoline salt.

Additionally, not less than two kinds of the polymers may be used in the present invention. In this case, it is required that at least one kind polymer is combined with the hydrophobic linear polyrotaxane molecule through the cyclic molecule.

Further, such a polymer may be a homopolymer or a copolymer. In case of the copolymer, the copolymer may be constituted of not less than two kinds of the monomers, and may be any of a block copolymer, an alternating copolymer, a random copolymer and a graft copolymer.

Concrete examples of such a polymer are polyvinyl alcohol, polyvinyl pyrrolidone, poly(meth)acrylic acid, cellulose-based resin such as carboxymethyl cellulose, hydroxyethyl cellulose, hydroxypropyl cellulose and the like, polyacrylamide, polyethylene oxide, polyethylene glycol, polypropylene glycol, polyvinyl acetal-based resin, polyvinylmethyl ether, polyamine, polyethylene imine, casein, gelatin, starch, and a copolymer of these, polyolefin-based resin such as polyethylene, polypropylene, and a copolymer resin of these with other olefin-based monomers, polyester resin, polyvinyl chloride resin, polystyrene-based resin such as polystyrene, acrylonitrile-styrene copolymer resin or the like, acrylic resin such as polymethylmethacrylate, (meth)acrylate ester copolymer, acrylonitrile-methyl acrylate copolymer or the like, polycarbonate resin, polyurethane resin, vinyl chloride-vinyl acetate copolymer resin, polyvinyl butyral resin and a derivative or a modified compound of these, polyisobutylene, poytetrahydrofuran, polyaniline, acrylonitrile-butadiene-styrene copolymer (ABS resin), polyamides such as Nylon (registered trade mark) and the like, polyimides, polydienes such as polyisoprene, polybutadiene and the like, polysiloxanes such as polydimethyl siloxane and the like, polysulfones, polyimines, polyacetic anhydrides, polyureas, polysulfides, polyphosphazenes, polyketones, polyphenylenes, polyhaloolefins, and derivatives of these.

The derivatives preferably have hydroxyl group, amino group, carboxyl group, epoxy group, vinyl group, thiol group, or the photocrosslinking group, or a group relating to any combination of these.

In the present invention, the compounding ratio of the hydrophobic linear polyrotaxane molecule and the above-mentioned polymer is suitably changed in accordance with applications and desired physical properties, and can be typically within a range of from 1/20 to 10/1 in weight ratio (hydrophobic linear polyrotaxane molecule/polymer).

In the crosslinked polyrotaxane of the present invention, combining between the cyclic molecule of the polyrotaxane and the polymer is preferably made through a chemical bonding with a crosslinking agent.

As the crosslinking agent, one having a molecular weight of less than 2000, preferably less than 1000, more preferably less than 600, furthermore preferably less than 400 may be used.

Concrete examples of such a crosslinking agent are cyanuric chloride, trimethoyl chloride, terephthaloyl chloride, epichlorohydrin, dibromobenzene, glutaraldehyde, phenylene diisocyanate, tolylene diisocyanate, divinyl sulfone, 1,1'-carbonyl diimidazole, and alkoxy silanes, in which these are used in singly with one kind or in combination of not less than two kinds in the present invention.

As discussed above, in a case where polycaprolactone is used as the hydrophobic linear molecule of the hydrophobic linear polyrotaxane molecule, it preferably has a molecular weight ranging from 5,000 to 100,000; however, polycaprolactone preferably has a molecular weight ranging from 5,000 to 20,000 and more preferably has a molecular weight ranging from 5,000 to 10,000 particularly in case of the hydrophobic linear crosslinked polyrotaxane molecule.

FIG. 1 is a schematic illustration which conceptually shows the hydrophobic linear polyrotaxane molecule of the present invention.

In the same figure, this hydrophobic linear polyrotaxane molecule 5 has hydrophobic linear molecule 6, cyclic molecules 7, and blocking groups 8 placed at the both end terminals of linear molecule 6, in which the linear molecule 6 includes cyclic molecules 7 with piercing through an opening section of cyclic molecules 7.

Figure 2:
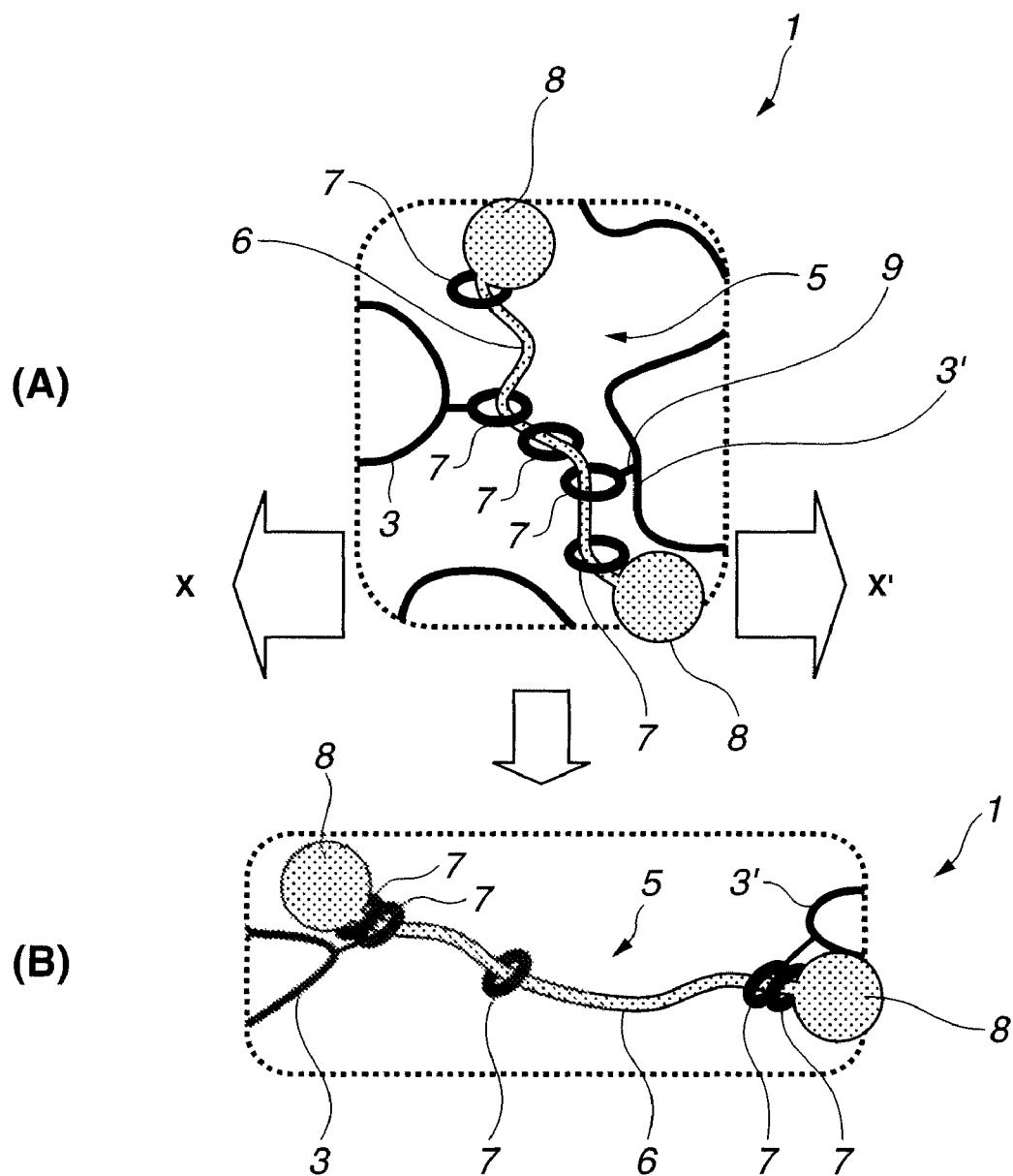
FIG. 2 is a schematic illustration which conceptually shows the crosslinked polyrotaxane of the present invention.

FIG. 2 is a schematic illustration which conceptually shows the crosslinked polyrotaxane of the present invention.

In the same figure, this crosslinked polyrotaxane 1 has polymer 3 and the above-mentioned hydrophobic linear polyrotaxane molecule 5. Additionally, this polyrotaxane 5 is combined at crosslinking points 9 with polymer 3 and polymer 3' through cyclic molecules 7.

When a deformation stress in a direction of arrows X-X' at an (A) section in FIG. 2 is loaded to crosslinked polyrotaxane 1 having such a configuration, crosslinked polyrotaxane 1 can deform as indicated at a (B) section in FIG. 2 thereby absorbing this stress.

In other words, as shown in the (B) section in FIG. 2, cyclic molecules 7 are movable along linear molecule 6 under the pulley effect, and therefore the crosslinked polyrotaxane can absorb the above-mentioned stress thereinside.

Thus, the crosslinked polyrotaxane of the present invention has the pulley effect as shown in the figure, and therefore has excellent elasticity, viscoelasticity and mechanical strength as compared with conventional gel-like materials.

Additionally, the hydrophobic linear polyrotaxane molecule of the present invention as a precursor of this crosslinked polyrotaxane is improved in solubility in the organic solvent as discussed above, and therefore its crosslinking or the like in the organic solvent is readily made.

Accordingly, the crosslinked polyrotaxane of the present invention can be readily obtained under a condition where the organic solvent exists. Particularly, the crosslinked polyrotaxane can be readily produced by crosslinking the hydrophobic linear polyrotaxane molecule of the present invention with the polymer which is soluble in organic solvent.

Therefore, the crosslinked polyrotaxane of the present invention is extended in its application range and applicable, for example, to paint or adhesive using a coating film polymer which is soluble in organic solvent, particularly paint, resin base material and adhesive for automotive vehicles requiring a car-washing resistance, a scratching resistance, a chipping resistance, an impact resistance and a weather resistance, and also to paint, resin base material and the like for home electric appliances, in which the excellent pulley effect can be exhibited in such applications.

From the other viewpoints, the crosslinked polyrotaxane of the present invention is formed as a composite of the above-mentioned polymer and the hydrophobic linear polyrotaxane molecule without degrading the physical properties of the polymer which is a crosslinking object of the hydrophobic linear polyrotaxane molecule.

Accordingly, according to the below-discussed production method of the crosslinked polyrotaxane of the present invention, not only a material having both the physical properties of the above-mentioned polymer and the physical properties of the hydrophobic linear polyrotaxane molecule itself can be obtained, but also a material having a desired mechanical strength and the like, particularly a gel-like material can be obtained by selecting kinds of the polymer.

The crosslinked polyrotaxane of the present invention is soluble in organic solvent, in case that the polymer serving as the crosslinking object is hydrophobic and has a molecular weight not so high, for example, up to about several thousands of molecular weight.

Next, a production method of the crosslinked polyrotaxane of the present invention will be discussed.

This crosslinked polyrotaxane can be produced first by producing the hydrophobic linear polyrotaxane molecule as discussed above, and (a) mixing the obtained hydrophobic linear polyrotaxane molecule with the polymer, (b) physically and/or chemically making crosslinking of at least a part of the polymer, and (c) combining the at least a part of the polymer and the polyrotaxane through the cyclic molecule.

The hydrophobic linear polyrotaxane molecule of the present invention is soluble in organic solvent, and therefore the steps (a) to (c) can be smoothly carried out in organic solvent.

At the step (b), a chemical crosslinking is preferably made and carried out by the crosslinking agent as discussed above. Additionally, the step (b) and the step (c) may be almost simultaneously carried out.

The mixing step at the step (a) can be carried out without a solvent or in a solvent, depending on the polymer to be used. The useable solvents are not limited to particular ones; however, examples of the solvents are water, toluene, xylene, benzene, anisole, cyclohexane, N-methylpyrrolidone, dimethyl formamide, dimethyl acetoamide, methyl ethyl ketone, chloroform, dichloromethane, carbon tetrachloride, hexafluoro isopropylalcohol, tetrahydrafuran, dioxane, acetone, ethyl acetate, dimethyl sulfoxide, acetonitrile, and the like.

The crosslinking step at the step (b) may be carried out under conventional and known crosslinking conditions, depending on the polymer to be used.

For example, (i) in case that the polymer has an active substituent such as epoxy group, a crosslinking reaction may take place under heating or in the presence of active hydrogen such as that in amine or acid anhydride. Additionally, the crosslinking reaction also can take place under light irradiation in the presence of a photoacid generator or a photobase generator.

(ii) In case that the polymer has an unsaturated double bond such as a vinyl group, the crosslinking reaction can take place under heating or light irradiation in the presence of heat or a photoradical generator.

(iii) In case that the polymer has the above-mentioned photocrosslinking group, the crosslinking reaction can take place under heating or light irradiation.

(iv) In case that the polymer has a hydroxyl group, an amino group, a carboxyl group and the like, the crosslinking reaction can take place in the presence of multi-substituted isocyanates, carbodiimides, triazines or silanes.

(v) In case that the polymer does not have any kind of group, the crosslinking reaction can take place under electron beam irradiation.

The combining step at the step (c) is carried out under a chemical reaction of the groups that the polymer has at the main chain and/or the side chain, for example, hydroxyl group, amino group, carboxyl group, epoxy group, vinyl group, thiol group, photocrosslinking group and the like, with the group that the cyclic molecule has, for example, hydroxyl group, amino group, carboxyl group, epoxy group, vinyl group, thiol group, photocrosslinking group and the like.

Although the condition of this combining step is affected by the groups that the polymer has, the groups that the cyclic molecule has, and the like, the above-mentioned crosslinking conditions can be applied.

The crosslinked polyrotaxane of the present invention can be produced even by obtaining the polymer from the corresponding monomer and by using the obtained polymer, in the above-mentioned production method.

EXAMPLE

Hereafter, the present invention will be further discussed with reference to some examples; however, the present invention is not limited to these examples.

Example 1

(1) Preparation of PCL-Carboxylic Acid by TEMPO Oxidation of PCL 10 g of PCL (polycaprolactone) having a molecular weight of 5,000, 100 mg of TEMPO (2,2,6,6-tetramethyl-1-piperidinyl-oxy radical) and 1 g of sodium bromide were dissolved in 100 ml of acetone. An aqueous solution of commercially available sodium hypochlorite (available chlorine concentration: 5%) in an amount of 5 ml was added and stirred at room temperature for 10 minutes. In order to decompose excessive sodium hypochlorite, ethanol was added to an extent of 5 ml in maximum so as to terminate the reaction.

Thereafter, the solution was distilled out by an evaporator. Then, the components were dissolved in 250 ml of warm ethanol and then allowed to stand in a freezer (about −4° C.) overnight so as to precipitate only PCL-carboxylic acid, followed by recovering and drying.

(2) Preparation of Inclusion Complex by Using PCL-Carboxylic Acid and α-CD

The above-mentioned prepared PCL-carboxylic acid in an amount of 0.2 g was dissolved in 50 ml of acetone, while α-CD (cyclodextrin) in an amount of 7.25 g was dissolved in 50 ml of water. After both of them were heated to 70° C., a PCL solution was added to an aqueous solution of CD bit by bit and then subjected to a ultrasonic treatment at a temperature of 70° C. for 17 minutes. Thereafter, precipitate obtained upon setting the solution aside for 10 hours was recovered and dried.

(3) Amount Reduction of α-CD and Blocking of the Inclusion Complex Using Adamantane Amine and BOP Reagent Reaction System In 10 ml of DMF (dimethylformamide), 3 g of BOP reagent (benzotirazole-1-yl-oxy-tris-(dimethylamino) phosphonium hexafluorophosphate), 1 g of HOBt (1-hydroxybenzotriazole), 1.4 g of adamantane amine and 1.25 ml of diisopropylethyl amine were dissolved in this order at room temperature. 14 g of the inclusion complex prepared at the step (2) was dispersed in a mixture solvent of DMF/DMSO (75/25), to which the obtained solution was added and then it was smoothly and sufficiently shaken. A sample in a slurry state was allowed to stand in a refrigerator overnight. Thereafter, 50 ml of a mixture solution of DMF/methanol=1/1 was added, and then it was sufficiently mixed and centrifuged, followed by discarding a supernatant. Washing with the above-mentioned mixture solution of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized. A cycle including dissolving in DMSO, precipitation in water, recovery and drying, as discussed above, was repeated two times, thereby finally obtaining purified polyrotaxane.

The obtained purified polyrotaxane was identified with $^1$H-NMR and GPC (gel permeation chromatograph) thereby being confirmed to be a desired polyrotaxane. Here, an inclusion amount of α-CD was 0.06.

Table 1 shows raw materials of the polyrotaxane of this example, and the inclusion amount of CD.

Example 2

(1) Preparation of PCL-Carboxylic Acid by TEMPO Oxidation of PCL 10 g of PCL having a molecular weight of 5,000, 100 mg of TEMPO and 1 g of sodium bromide were dissolved in 100 ml of acetone. An aqueous solution of commercially available sodium hypochlorite (available chlorine concentration: 5%) in an amount of 5 ml was added and stirred at room temperature for 10 minutes. In order to decompose excessive sodium hypochlorite, ethanol was added to an extent of 5 ml in maximum so as to terminate the reaction.

Thereafter, the solution was distilled out by an evaporator. Then, the components were dissolved in 250 ml of warm ethanol and then allowed to stand in a freezer (about −4° C.) overnight so as to precipitate only PCL-carboxylic acid, followed by recovering and drying.

(2) Preparation of Inclusion Complex by Using PCL-Carboxylic Acid and α-CD

The above-mentioned prepared PCL-carboxylic acid in an amount of 0.2 g was dissolved in 50 ml of acetone, while α-CD in an amount of 7.25 g was dissolved in 50 ml of water. After both of them were heated to 70° C., a PCL solution was added to an aqueous solution of CD bit by bit and then subjected to a ultrasonic treatment at a temperature of 70° C. for 17 minutes. Thereafter, precipitate obtained upon setting the solution aside for 10 hours was recovered and dried.

(3) Blocking of the Inclusion Complex Using Adamantane Amine and BOP Reagent Reaction System In 10 ml of DMF, 3 g of BOP reagent, 1 g of HOBt, 1.4 g of adamantane amine and 1.25 ml of diisopropylethyl amine were dissolved in this order at room temperature, to which 14 g of the inclusion complex prepared at the step (2) was added and it was smoothly and sufficiently shaken. A sample in a slurry state was allowed to stand in a refrigerator overnight. Thereafter, 50 ml of a mixture solution of DMF/methanol=1/1 was added, and then it was sufficiently mixed and centrifuged, followed by discarding a supernatant. Washing with the above-mentioned mixture solution of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized. A cycle including dissolving in DMSO, precipitation in water, recovery and drying, as discussed above, was repeated two times, thereby finally obtaining purified polyrotaxane.

The obtained purified polyrotaxane was identified with $^1$H-NMR and GPC thereby being confirmed to be a desired polyrotaxane. Here, an inclusion amount of α-CD was 0.61.

Table 1 shows raw materials of the polyrotaxane of this example, and the inclusion amount of CD.

Example 3

A procedure of Example 1 was repeated with the exception that PCL had a molecular weight of 100,000, thereby obtaining a polyrotaxane of this example. An inclusion amount of CD was 0.06.

Table 1 shows raw materials of the polyrotaxane of this example, and the inclusion amount of CD.

Example 4

A procedure of Example 2 was repeated with the exception that PCL had a molecular weight of 100,000, thereby obtaining a polyrotaxane of this example. An inclusion amount of CD was 0.61.

Table 1 shows raw materials of the polyrotaxane of this example, and the inclusion amount of CD.

Example 5

(1) Preparation of PTHF-Carboxylic Acid by TEMPO Oxidation of PTHF 10 g of polytetrahydrofuran (PTHF) (molecular weight: 5000), 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration:

5%) in an amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in 250 ml of warm ethanol and then allowed to stand in a freezer (−4° C.) overnight thereby extracting only PTHF-carboxylic acid, followed by recovering and drying.

(2) Preparation of Inclusion Complex by Using PTHF-Carboxylic Acid and α-CD

The above-mentioned prepared PTHF-carboxylic acid in an amount of 3 g and α-cyclodextrin (α-CD) in an amount of 12 g were respectively dissolved in 50 ml of warm water of 70° C. which were respectively prepared, upon which they were mixed and well stirred, followed by being allowed to stand in a refrigerator (4° C.) overnight. Then, an inclusion complex precipitated in cream-state was lyophilized and recovered.

(3) Blocking of the Inclusion Complex Using Adamantane Amine and BOP Reagent Reaction System In 10 ml of DMF, 3 g of BOP reagent, 1 g of HOBt, 1.4 g of adamantane amine and 1.25 ml of diisopropylethyl amine were dissolved in this order at room temperature. 14 g of the inclusion complex prepared as discussed above was added thereto and then it was smoothly and sufficiently shaken.

A sample in a slurry state was allowed to stand in a refrigerator (4° C.) overnight. After standing overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as discussed above, was repeated two times, thereby finally obtaining purified polyrotaxane.

Example 6

(1) Preparation of PEG Carboxylic PPG-Carboxylic Acid by TEMPO Oxidation of PPG 10 g of polypropylene glycol (PPG) (molecular weight: 5000), 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in an amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in 250 ml of warm ethanol and then allowed to stand in a freezer (−4° C.) overnight thereby extracting only PPG-carboxylic acid, followed by recovering and drying.

(2) Preparation of Inclusion Complex by Using PPG-Carboxylic Acid and α-CD

The above-mentioned prepared PPG-carboxylic acid in an amount of 3 g and α-cyclodextrin (α-CD) in an amount of 12 g were respectively dissolved in 50 ml of warm water of 70° C. which were respectively prepared, upon which they were mixed and well stirred, followed by being allowed to stand in a refrigerator (4° C.) overnight. Then, an inclusion complex precipitated in cream-state was lyophilized and recovered.

(3) Blocking of the Inclusion Complex Using Adamantane Amine and BOP Reagent Reaction System In 10 ml of DMF, 3 g of BOP reagent, 1 g of HOBt, 1.4 g of adamantane amine and 1.25 ml of diisopropylethyl amine were dissolved in this order at room temperature. 14 g of the inclusion complex prepared as discussed above was added thereto and then it was smoothly and sufficiently shaken.

A sample in a slurry state was allowed to stand in a refrigerator (4° C.) overnight. After standing overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as discussed above, was repeated two times, thereby finally obtaining purified polyrotaxane.

Example 7

(1) Preparation of PEG-PPG-PEG-Carboxylic Acid by TEMPO Oxidation of PEG-PPG-PEG 10 g of polyethylene glycol-polypropylene glycol triblock copolymer (PEG-PPG-PEG) (molecular weight: 5000), 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in an amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in 250 ml of warm ethanol and then allowed to stand in a freezer (−4° C.) overnight thereby extracting only PEG-PPG-PEG-carboxylic acid, followed by recovering and drying.

(2) Preparation of Inclusion Complex by Using PEG-PPG-PEG-Carboxylic Acid and α-CD The above-mentioned prepared PEG-PPG-PEG-carboxylic acid in an amount of 3 g and α-cyclodextrin (α-CD) in an amount of 12 g were respectively dissolved in 50 ml of warm water of 70° C. which were respectively prepared, upon which they were mixed and well stirred, followed by being allowed to stand in a refrigerator (4° C.) overnight. Then, an inclusion complex precipitated in cream-state was lyophilized and recovered.

(3) Blocking of the Inclusion Complex Using Adamantane Amine and BOP Reagent Reaction System In 10 ml of DMF, 3 g of BOP reagent, 1 g of HOBt, 1.4 g of adamantane amine and 1.25 ml of diisopropylethyl amine were dissolved in this order at room temperature. 14 g of the inclusion complex prepared as discussed above was added thereto and then it was smoothly and sufficiently shaken.

A sample in a slurry state was allowed to stand in a refrigerator (4° C.) overnight. After standing overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as discussed above, was repeated two times, thereby finally obtaining purified polyrotaxane.

Comparative Example 1

(1) Preparation of PEG-Carboxylic Acid by TEMPO Oxidation of PEG 10 g of PEG (polyethylene glycol) having a molecular weight of 5000, 100 mg of TEMPO and 1 g of sodium bromide were dissolved in 100 ml of water. An aqueous solution of commercially available sodium hypochlorite (available chlorine concentration: 5%) in an amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in 250 ml of warm ethanol and then allowed to stand in a freezer (−4° C.) overnight thereby extracting only PEG-carboxylic acid, followed by recovering and drying.

(2) Preparation of Inclusion Complex by Using PEG-Carboxylic Acid and α-CD

The above-mentioned prepared PEG-carboxylic acid in an amount of 3 g and α-CD in an amount of 12 g were respectively dissolved in 50 ml of warm water of 70° C. which were respectively prepared, upon which they were mixed and well stirred, followed by being allowed to stand in a refrigerator (4° C.) overnight. Then, an inclusion complex precipitated in cream-state was lyophilized and recovered.

(3) Amount Reduction of α-CD and Blocking of the Inclusion Complex Using Adamantane Amine and BOP Reagent Reaction System In 10 ml of DMF, 3 g of BOP reagent, 1 g of HOBt, 1.4 g of adamantane amine and 1.25 ml of diisopropylethyl amine were dissolved in this order at room temperature. 14 g of the inclusion complex prepared at the step (2) was dispersed in a mixture solvent of DMF/DMSO (75/25), to which the obtained solution was added and then it was smoothly and sufficiently shaken. A sample in a slurry state was allowed to stand in a refrigerator overnight. Thereafter, 50 ml of a mixture solution of DMF/methanol=1:1 was added, and then it was well mixed and centrifuged, followed by discarding a supernatant. Washing with the above-mentioned mixture solution of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized. A cycle including dissolving in DMSO, precipitation in water, recovery and drying was repeated two times, thereby finally obtaining purified polyrotaxane.

The obtained purified polyrotaxane was identified with $^1$H-NMR and GPC thereby being confirmed to be a desired polyrotaxane. Here, an inclusion amount of ax-CD was 0.06.

Table 1 shows raw materials of the polyrotaxane of this example, and the inclusion amount of CD.

Comparative Example 2

(1) Preparation of PEG-Carboxylic Acid by TEMPO Oxidation of PEG 10 g of PEG (polyethylene glycol) having a molecular weight of 5000, 100 mg of TEMPO and 1 g of sodium bromide were dissolved in 100 ml of water. An aqueous solution of commercially available sodium hypochlorite (available chlorine concentration: 5%) in an amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in 250 ml of warm ethanol and then allowed to stand in a freezer (−4° C.) overnight thereby extracting only PEG-carboxylic acid, followed by recovering and drying.

(2) Preparation of Inclusion Complex by Using PEG-Carboxylic Acid and α-CD

The above-mentioned prepared PEG-carboxylic acid in an amount of 3 g and α-CD in an amount of 12 g were respectively dissolved in 50 ml of warm water of 70° C. which were respectively prepared, upon which they were mixed and well stirred, followed by being allowed to stand in a refrigerator (4° C.) overnight. Then, an inclusion complex precipitated in cream-state was lyophilized and recovered.

(3) Blocking of the Inclusion Complex Using Adamantane Amine and BOP Reagent Reaction System In 50 ml of DMF, 3 g of BOP reagent, 1 g of HOBt, 1.4 g of adamantane amine and 1.25 ml of diisopropylethyl amine were dissolved in this order at room temperature. 14 g of the inclusion complex prepared at the step (2) was added and then it was smoothly and sufficiently shaken. A sample in a slurry state was allowed to stand in a refrigerator overnight. Thereafter, 50 ml of a mixture solution of DMF/methanol=1:1 was added, and then it was well mixed and centrifuged, followed by discarding a supernatant. Washing with the above-mentioned mixture solution of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized. A cycle including dissolving in DMSO, precipitation in water, recovery and drying was repeated two times, thereby finally obtaining purified polyrotaxane.

The obtained purified polyrotaxane was identified with $^1$H-NMR and GPC thereby being confirmed to be a desired polyrotaxane. Here, an inclusion amount of α-CD was 0.61.

Table 1 shows raw materials of the polyrotaxane of this example, and the inclusion amount of CD.

Comparative Example 3

A procedure of Comparative Example 1 was repeated with the exception that PEG had a molecular weight of 100,000, thereby obtaining a polyrotaxane of this example. An inclusion amount of CD was 0.06.

Table 1 shows raw materials of the polyrotaxane of this example, and the inclusion amount of CD.

Comparative Example 4

A procedure of Comparative Example 2 was repeated with the exception that PEG had a molecular weight of 100,000, thereby obtaining a polyrotaxane of this example. An inclusion amount of CD was 0.61.

Table 1 shows raw materials of the polyrotaxane of this example, and the inclusion amount of CD.

[Performance Evaluation]

The solubility of the polyrotaxanes of respective Examples in organic solvents (such as butyl acetate and butylcellosolve) was examined under conditions mentioned below. Obtained results are shown in Table 1.

(Test Conditions)

To 10 g of each organic solvent heated to 50° C., 1 g of the polyrotaxane of each Example was gradually added thereby examining the solubility.

In Table 1, "A" indicates the fact that not less than 0.75 g was dissolved; "B" indicates the fact that not less than 0.25 g and less than 0.75 g was dissolved; "C" indicates the fact that less than 0.25 g was dissolved; and "D" indicates insolubility.

TABLE 1

| Items | Examples | | | | | | |
|---|---|---|---|---|---|---|---|
| | 1 | 2 | 3 | 4 | 5 | 6 | 7 |
| Linear molecule | | | PCL | | PTHF | PPG | PEG-PPG-PEG |
| Molecular weight of Linear molecule (×10$^3$) | 5 | 5 | 100 | 100 | 5 | 5 | 5 |
| Inclusion amount of CD | 0.06 | 0.61 | 0.06 | 0.61 | 0.61 | 0.61 | 0.61 |
| Solubility in butylcellosolve | A | A | A | A | B | C | C |
| Solubility in butyl acetate | B | B | B | B | C | C | C |

| Items | Comparative Examples | | | |
|---|---|---|---|---|
| | 1 | 2 | 3 | 4 |
| Linear molecule | PEG | | | |
| Molecular weight of Linear molecule (×10$^3$) | 5 | 5 | 100 | 100 |
| Inclusion amount of CD | 0.06 | 0.61 | 0.06 | 0.61 |
| Solubility in butylcellosolve | D | D | D | D |
| Solubility in butyl acetate | D | D | D | D |

As apparent from Table 1, the polyrotaxanes of Examples 1 to 7 within the scope of the present invention are soluble in organic solvents such as butyl acetate and butylcellosolve; however, it will be understood that the polyrotaxanes of Comparative Examples 1 to 4 are inferior in solubility in these solvents.

Therefore, the polyrotaxanes of Examples 1 to 7 are superior in applicability to a paint, an adhesive, a fat and oil, and the like requiring a variety of organic solvents.

EXPLANATION OF REFERENCE NUMERALS

1 Crosslinked polyrotaxane
3, 3' Polymer
5 Polyrotaxane
6 Linear molecule
7 Cyclic molecule
8 Blocking group
9 Crosslinking point

The invention claimed is:
1. A hydrophobic linear polyrotaxane molecule comprising a cyclic molecule, a linear molecule piercing through the cyclic molecule, and blocking groups placed at both end terminals of the linear molecule to prevent the cyclic molecule from leaving from the linear molecule, wherein the linear molecule is polycaprolactone.

2. A hydrophobic linear polyrotaxane molecule as claimed in claim 1, wherein the polycaprolactone has a molecular weight ranging from 5,000 to 100,000.

3. A hydrophobic linear polyrotaxane molecule as claimed in claim 1, wherein the cyclic molecule is at least one cyclodextrin selected from the group consisting of α-cyclodextrin, β-cyclodextrin and γ-cyclodextrin.

4. A hydrophobic linear polyrotaxane molecule as claimed in claim 3, wherein the cyclodextrin has an inclusion amount ranging from 0.06 to 0.61 relative to 1 which is the maximum inclusion amount of the cyclodextrin capable of being included by the linear molecule.

5. A hydrophobic linear polyrotaxane molecule as claimed in claim 1, wherein the hydrophobic linear polyrotaxane molecule is soluble in a solvent.

6. A production method for producing the hydrophobic linear polyrotaxane molecule as claimed in claim 1, comprising:

(1) mixing a cyclic molecule and a hydrophobic linear molecule so as to cause hydrophobic linear molecule piercing through an opening section of the cyclic molecule; and (2) blocking both end terminals of the linear molecule, serving as both end terminals of an obtained pseudo-polyrotaxane, with blocking groups so as to make adjustment to prevent the cyclic molecule from releasing from a piercing condition.

7. A crosslinked polyrotaxane formed by combining the hydrophobic linear polyrotaxane molecule as claimed in claim 1 and a polymer through the cyclic molecule.

* * * * *